US012703165B2

(12) United States Patent
Runft et al.

(10) Patent No.: US 12,703,165 B2
(45) Date of Patent: Aug. 11, 2026

(54) ROTARY PRESS AND METHOD FOR CLEANING A ROTARY PRESS

(71) Applicant: Syntegon Technology GmbH, Waiblingen (DE)

(72) Inventors: Werner Runft, Winnenden (DE); Torsten Grass, Urbach (DE); Fabian Werner, Waiblingen (DE)

(73) Assignee: Syntegon Technology GmbH, Waiblingen (DE)

( * ) Notice: Subject to any disclaimer, the term of this patent is extended or adjusted under 35 U.S.C. 154(b) by 70 days.

(21) Appl. No.: 18/823,994

(22) Filed: Sep. 4, 2024

(65) Prior Publication Data

US 2025/0115019 A1 Apr. 10, 2025

(30) Foreign Application Priority Data

Oct. 4, 2023 (DE) ..................... 10 2023 126 993.3

(51) Int. Cl.
*B30B 15/00* (2006.01)
*B08B 3/02* (2006.01)
*B30B 11/08* (2006.01)

(52) U.S. Cl.
CPC ............ *B30B 15/0082* (2013.01); *B08B 3/02* (2013.01); *B30B 11/08* (2013.01)

(58) Field of Classification Search
CPC ........ B30B 15/0082; B30B 11/08; B08B 3/02; B08B 3/08
See application file for complete search history.

(56) References Cited

U.S. PATENT DOCUMENTS

| | | | | |
|---|---|---|---|---|
| 5,536,331 A | 7/1996 | Korsch | | |
| 2003/0042639 A1* | 3/2003 | Christiaens | B30B 11/08 | 425/351 |
| 2005/0151292 A1* | 7/2005 | Shimada | B29C 43/34 | 264/109 |
| 2010/0003361 A1* | 1/2010 | Kramer | B08B 3/02 | 425/231 |

FOREIGN PATENT DOCUMENTS

| | | | |
|---|---|---|---|
| CN | 214927397 U | 11/2021 | |
| CN | 216139479 U | 3/2022 | |
| DE | 4326239 A1 | 2/1995 | |
| DE | 102011055361 A1 * | 5/2013 | B30B 15/0082 |

(Continued)

OTHER PUBLICATIONS

English translation of DE-102011055361-A1 by EPO. (Year: 2013).*

(Continued)

*Primary Examiner* — Inja Song

(74) *Attorney, Agent, or Firm* — Michael Best & Friedrich LLP

(57) ABSTRACT

A rotary press (10), in particular a rotary tablet press, includes a rotor (14) rotatable about an axis of rotation (12) and a cleaning device (16) for cleaning the rotary press (10). The cleaning device (16) includes at least one spray opening (18), in particular a plurality of spray openings (18), for spraying a cleaning agent (20). The cleaning device (16) is coupled to the rotor (14) and configured such that the spray opening (18) can be rotated about the axis of rotation (12) by rotating the rotor (14). A method for cleaning such a rotary press (10) is also described.

17 Claims, 8 Drawing Sheets

(56) References Cited

FOREIGN PATENT DOCUMENTS

| | | | | |
|---|---|---|---|---|
| JP | 2000301393 A | * | 10/2000 | ............. B30B 15/34 |
| WO | 2008104267 A1 | | 9/2008 | |
| WO | WO-2009021776 A2 | * | 2/2009 | ........... B08B 9/0936 |

OTHER PUBLICATIONS

English translation of WO-2009021776-A2 by EPO. (Year: 2009).*
English translation of JP-2000301393-A by EPO. (Year: 2000).*
European Patent Office Extended Search Report for Application No. 24201419.9 dated Feb. 10, 2025 (12 pages including English machine translation).
German Patent Office Action for Application No. 102023126993.3 dated May 17, 2024 (9 pages including English machine translation).

* cited by examiner

ROTARY PRESS AND METHOD FOR CLEANING A ROTARY PRESS

BACKGROUND

The invention relates to a rotary press, in particular a rotary tablet press, and to a method for cleaning a rotary press, in particular a rotary tablet press.

Tablet presses can be wet cleaned at the end of a tablet batch. The cleaning success of wet cleaning depends on whether as many surfaces of the tablet press as possible that need to be cleaned can be directly wetted with a cleaning liquid. It is therefore desirable that there are as few spray shadows as possible between the spray nozzles for the cleaning agent and the surfaces to be cleaned.

To avoid spray shadows, the number of spray nozzles can be increased. The spray nozzles themselves and/or their supply lines can create their own spray shadows. This can make arranging the spray nozzles and thus the tablet press itself very complex, in particular if the spray nozzles are arranged statically. To reduce spray shadows, the spray nozzles can be moved during the cleaning process.

WO 2009/021 776 A2 discloses a cleaning device for cleaning a capsule filling machine with a rotating cleaning unit, wherein the cleaning device has spray openings for spraying a cleaning agent.

SUMMARY

It is therefore an object of the present invention to provide a rotary press, in particular a rotary tablet press, and a method for cleaning a rotary press, in particular a rotary tablet press, wherein spray shadows are avoided or at least reduced and the design effort is kept to a minimum.

The above object is achieved by a rotary press, in particular a rotary tablet press, according to the disclosure.

The rotary press comprises a rotor that is rotatable about an axis of rotation. The rotor can be designed as a rotor disk. The rotor can be mounted so as to rotate about the axis of rotation.

The rotary press also comprises a cleaning device. The cleaning device is used to clean the rotary press. The cleaning device comprises at least one spray opening. The cleaning device comprises in particular a plurality of spray openings. The spray opening is used to spray a cleaning agent. The cleaning agent can be a liquid, a gas and/or a mixture of liquid and gas. The cleaning agent can in particular be a cleaning liquid.

The cleaning device (or the spray opening) is coupled to the rotor and configured such that the spray opening can be rotated about the axis of rotation by rotating the rotor. The spray opening of the cleaning device can be designed to rotate about the axis of rotation. The rotor can serve as a drive for the rotational movement of the spray opening. The rotor and the spray nozzle can be coupled to each other in such a way that when the rotor is rotated, the spray opening is also rotated, in particular at the same angular speed or rotational speed as the rotor. The rotor and the spray opening are designed in particular to be rotatable about the axis of rotation.

The rotary press can be suitable for wet cleaning using a cleaning liquid. The rotary press or the cleaning device can comprise supply lines, a pump and/or an appropriate waste water structure.

This allows the (rotational) movement of the rotor to be utilized to move the spray opening. A separate drive for the (rotational) movement of the spray opening is not necessary.

The design effort for a cleaning device can thus be reduced. Due to the rotation of the spray opening, spray shadows can be avoided or at least reduced during the cleaning process. The cleaning process can be carried out optimally and the cleaning time can be reduced. This allows the costs for the rotary press (low design effort) and for each cleaning process (due to avoidance of spray shadows) to be reduced.

According to a further development of the rotary press, a static spray nozzle can be arranged on the spray opening.

This allows the cleaning agent to be sprayed in a targeted manner and with a desired measured pressure using simple means. The spray pattern of the cleaning agent can be adjusted as desired.

According to a further development of the rotary press, a rotary spray nozzle can be arranged on the spray opening. The rotary spray nozzle can be spherical. The rotary spray nozzle can be designed to turn (rotate) during the cleaning process and thus spray the cleaning agent around its own axis of rotation. The rotational movement of the rotary spray nozzle can be caused by the cleaning agent escaping (recoil principle) (similar to a dishwasher).

This allows the cleaning agent to be distributed more effectively over as many surfaces as possible. The spray pattern of the cleaning agent can be adjusted as desired.

According to a further development of the rotary press, the cleaning device can comprise at least one internal feed channel, in particular a plurality of internal feed channels, for guiding the cleaning agent to the spray opening. The internal feed channel can be arranged at least in portions, in particular completely, within the rotor. The internal feed channel can open into the spray opening.

In this way, the spray opening (or at least part of the cleaning device) can be integrated into the rotor. This eliminates the need for external components, such as supply lines for the cleaning agent and static cleaning nozzles. These would also have to be cleaned extensively after a batch process. By integrating the spray opening into the rotor (disk), this additional cleaning effort for these components is eliminated. In other words, due to the integration of the spray opening (or the cleaning technology) into the rotor, many, in particular static, externally arranged, cleaning nozzles and their supply lines can be dispensed with. This reduces cleaning time, enhances the clear layout of the machine and saves costs.

According to a further development of the rotary press, the cleaning device can comprise at least one external feed channel, in particular a plurality of external feed channels, for guiding the cleaning agent to the spray opening. The external feed channel can be arranged at least in portions, in particular completely, outside the rotor. The external feed channel can open into the spray opening.

This makes it possible to implement a spray opening that rotates using the rotor with simple means. It is not necessary to convert and/or replace the rotor. For example, a rotary press can be "upgraded" with a rotor that does not have internal feed channels for guiding the cleaning agent.

According to a further development of the rotary press, the rotary press can comprise at least one upper tableting punch. Alternatively or additionally, the rotary press may comprise at least one lower tableting punch. The upper and lower tableting punches can be designed such that they cooperate to compress a powder, in particular to produce a tablet. The upper and/or lower tableting punch can each be designed as a tableting tool or as a tamping punch. The cleaning device can comprise at least one cleaning punch. The cleaning punch can be designed to be interchangeable with the lower and/or upper tableting punch. At least one channel for guiding the cleaning agent to the spray opening can be arranged within the cleaning punch. The channel can open into the spray opening.

This allows the cleaning agent to be sprayed in a targeted manner onto surfaces that would otherwise be difficult or impossible to reach, such as a guide curve of the tableting punch or tamping punch. The cleaning process can thus be further optimized.

According to a further development of the rotary press, the cleaning device can comprise at least one guide element. The guide element can be tubular. The guide element can be designed as a tube. The guide element can be designed so that it can be fixed (or fastened) to the rotor. The spray opening can be arranged in or on the guide element. At least one guide channel for guiding the cleaning agent to the spray opening can be arranged within the guide element. The guide channel can open into the spray opening.

This allows a spray opening to be moved radially outwards using simple means. The (radial in relation to the rotor) arrangement of the spray opening can thus be adjusted variably or in a targeted manner. The spraying of the cleaning agent can thus be adjusted in a targeted manner.

According to a further development of the rotary press, the cleaning device can comprise an inlet for guiding the cleaning agent into the rotor. The inlet can open into the rotor in the region of the axis of rotation. The inlet can be fluidically coupled to the internal feed channel, the external feed channel, the channel of the cleaning punch and/or the guide channel of the guide element. The inlet can be sealed using a sliding seal on the rotor. The inlet can be designed as a separate rotary union.

The internal feed channel, the external feed channel, the channel of the cleaning punch and/or the guide channel of the guide element can each be fluidically coupled to one another.

In the present case, a fluidic connection or fluidic coupling means that a gas and/or a liquid (fluid) can flow between two fluidically coupled elements or between two elements that are in fluidic connection.

This allows the cleaning agent to be guided through the rotor to the spray opening using simple means.

According to a further development of the rotary press, the cleaning device can comprise a pump for pumping the cleaning agent through the spray opening.

This allows the cleaning agent to be conveyed using simple means and thus sprayed through the spray opening.

The above object is also achieved by a method for cleaning a rotary press, in particular a rotary tablet press, according to the above statements.

The method comprises the steps of:

rotating the spray opening about the axis of rotation by rotating the rotor.

spraying the cleaning agent through the spray opening and/or through the static spray nozzle and/or through the rotary spray nozzle.

With regard to the advantages that can be achieved thereby, reference is made to the statements made in this respect about the rotary press. The measures described in connection with the rotary press and/or explained below can serve for further embodiment of the method.

The method may comprise the step of:

pumping the cleaning agent in a circuit. The cleaning agent can be pumped in a circle (in particular by means of a pump), i.e. it can be used several times.

This means that the cleaning agent can be used multiple times and thus conserved. This can reduce the cost of the cleaning agent.

The method may comprise the step of:

collecting and disposing of the sprayed cleaning agent after spraying the cleaning agent once through the spray opening and/or through the static spray nozzle and/or through the rotary spray nozzle.

This means that the cleaning agent is only used once. This means that a fresh and uncontaminated cleaning agent is always available for the cleaning process. This can improve the cleaning effect.

The method may comprise the step of:

guiding the cleaning agent through the internal feed channel, the external feed channel, the channel of the cleaning punch and/or the guide channel of the guide element.

The cleaning agent can thus be guided to the spray opening by simple means and sprayed via the spray opening.

The method may comprise the step of:

closing the spray opening and/or the internal feed channel. Closing can be implemented using the upper and/or lower tableting punch.

This allows the spray opening and/or the internal feed channel to be closed or opened again using simple (already existing) means. This allows the spraying of the cleaning agent from the spray opening to be controlled or adjusted as desired (the spray opening can be closed or opened).

BRIEF DESCRIPTION OF THE DRAWINGS

Further features, details and advantages of the invention emerge from the wording of the claims and from the following description of exemplary embodiments with reference to the drawings. In the drawings:

DETAILED DESCRIPTION

In the following description and in the figures, corresponding components and elements bear the same reference signs. For improved clarity, not all reference signs are reproduced in all figures.

Figure 1:
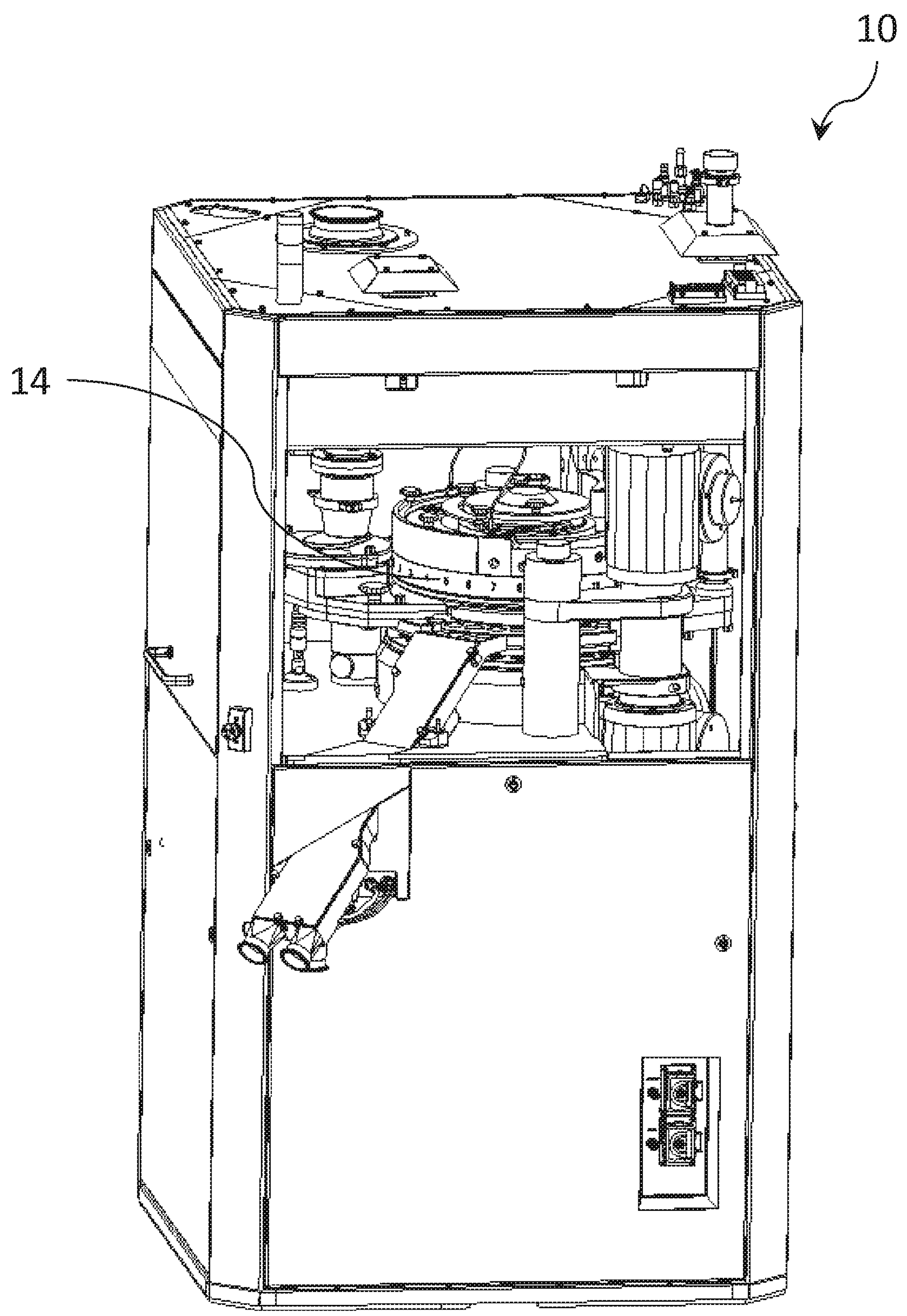
FIG. 1 is a perspective view of a rotary press having a rotor.
Figure 2:
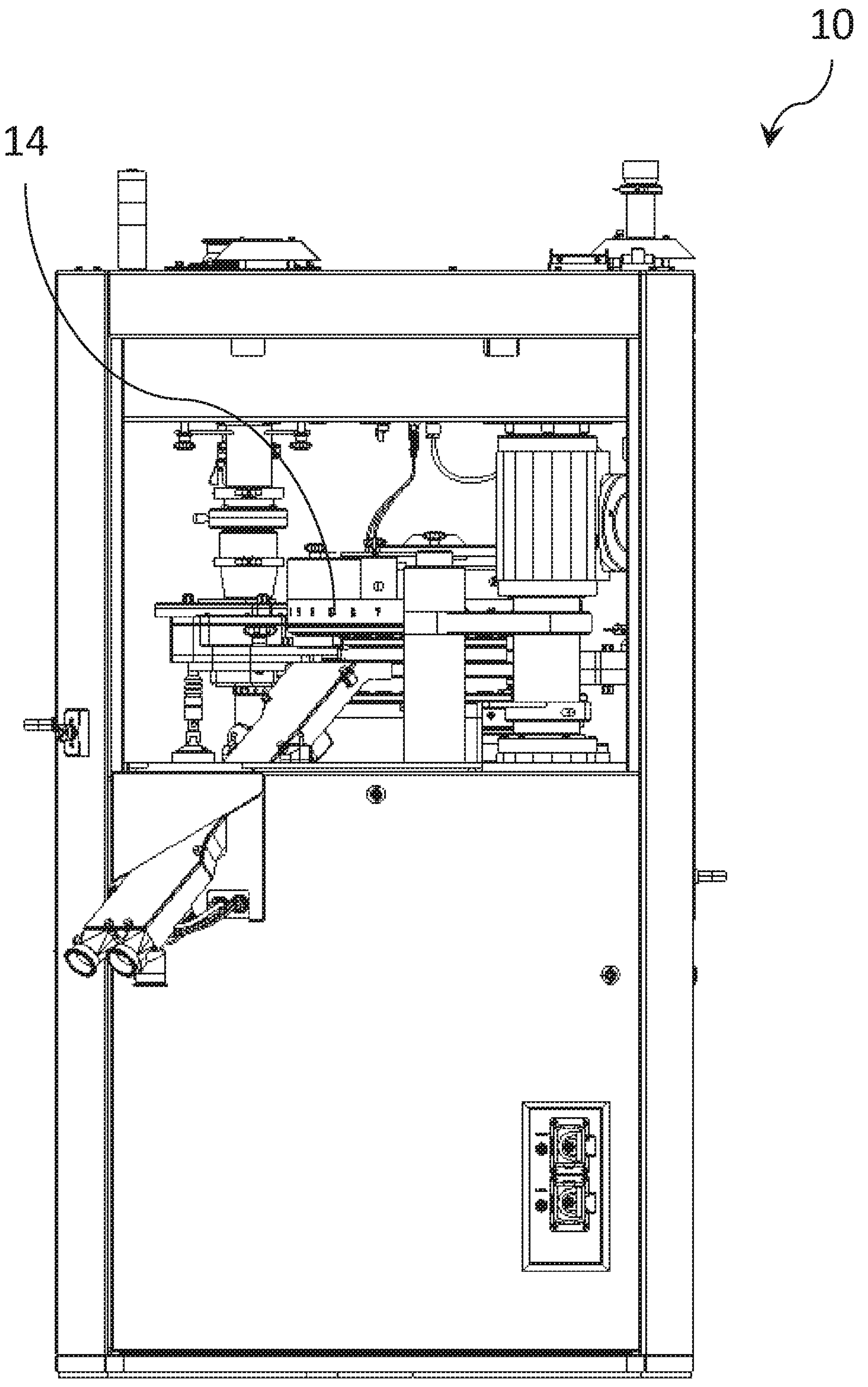
FIG. 2 is a side view of the rotary press according to FIG. 1.

FIGS. 1 and 2 show a perspective view and a side view of a rotary press 10 having a rotor 14. In the present case, the rotary press 10 is designed as a rotary tablet press.

Figure 3:
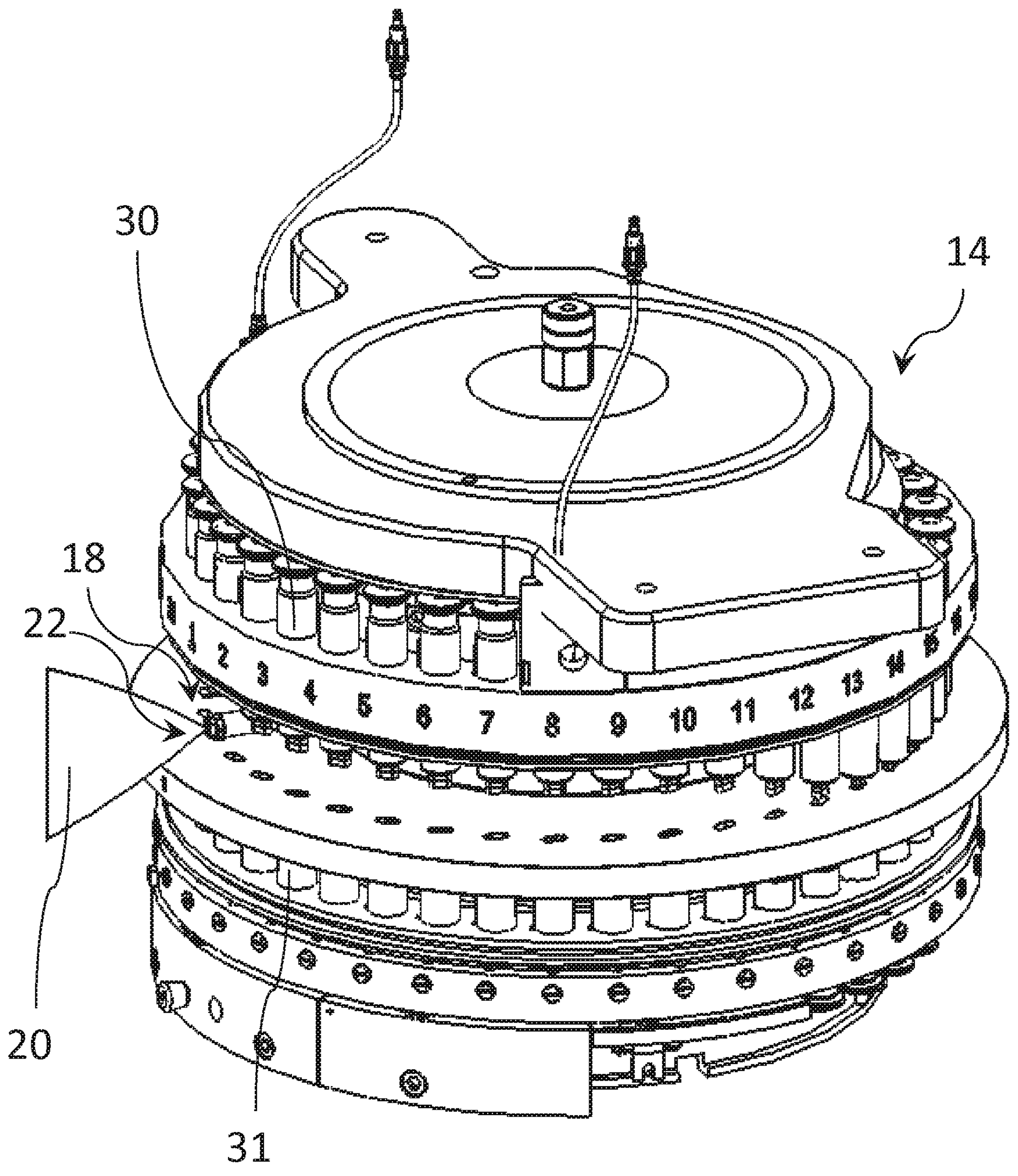
FIG. 3 is a perspective view of the rotor of the rotary press according to a first exemplary embodiment.
Figure 4:
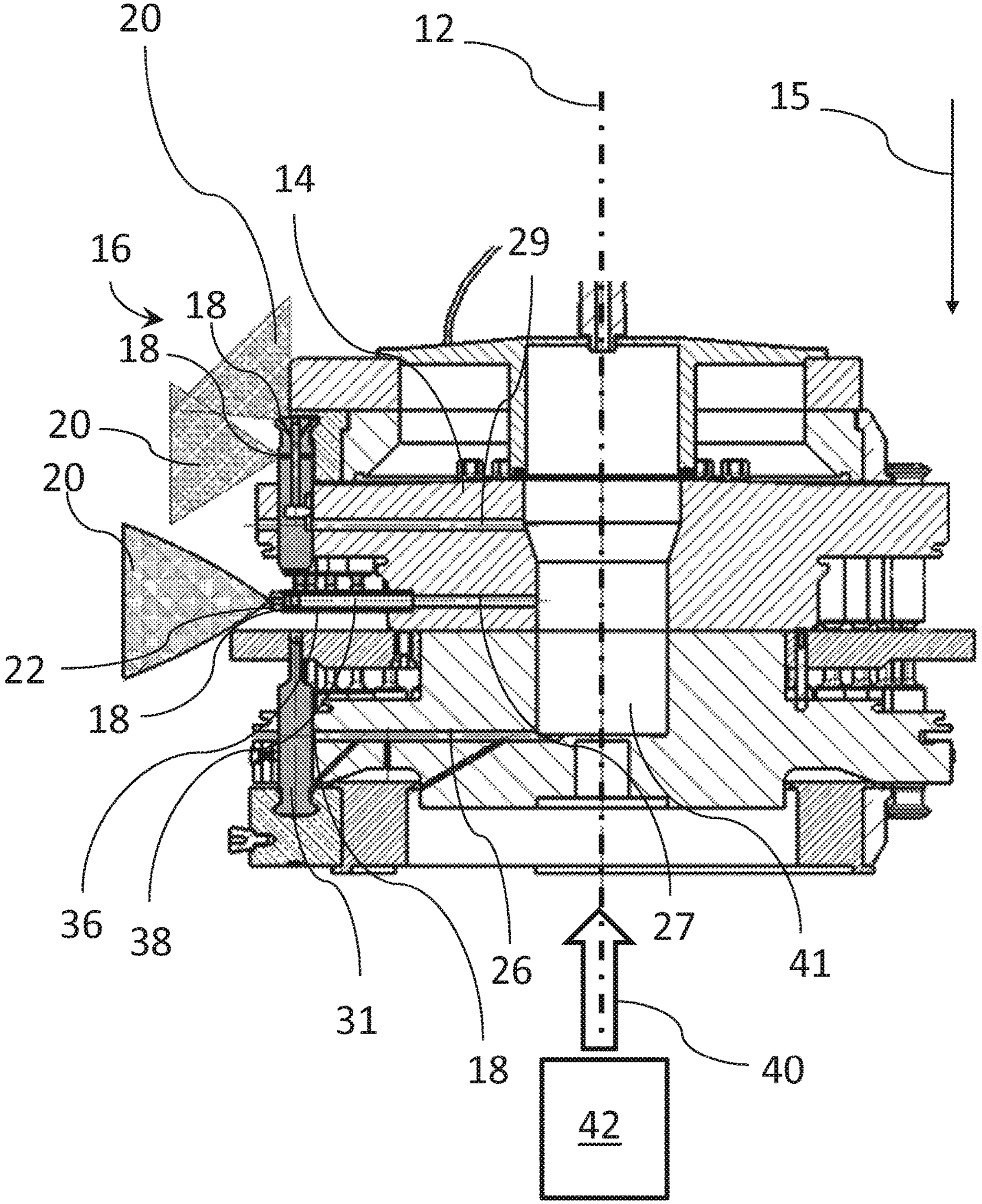
FIG. 4 is a sectional view of the rotor according to FIG. 3.

FIG. 3 shows a perspective view and FIG. 4 a sectional view of the rotor 14 of the rotary press 10 according to a first exemplary embodiment.

The rotor 14 is designed to be rotatable about an axis of rotation 12. The rotor 14 comprises a plurality of upper tableting punches 30 and a plurality of lower tableting punches 31 in the present case. The upper and/or lower tableting punches 30, 31 can be designed as tamping punches.

The rotor 14 comprises a cleaning device 16 for cleaning the rotary press 10. The cleaning device 16 comprises at least one spray opening 18 for spraying a cleaning agent 20. In the present case, the cleaning device 16 comprises a plurality of spray openings 18.

The cleaning device 16 is coupled in the present case to the rotor 14 and configured such that the spray openings 18 can be rotated about the axis of rotation 12 by rotating the rotor 14. The cleaning device 16 and in particular the spray openings 18 are thus rotated with the rotor 14. The cleaning device 16 is in particular integrated into the rotor 14.

The cleaning device 16 comprises in the present case a lower internal feed channel 26, a middle internal feed channel 27 and an upper internal feed channel 29 for guiding the cleaning agent 20 to the respective spray openings 18. The three internal feed channels 26, 27, 29 are arranged in the present case one above the other with respect to the direction of gravity 15.

The internal feed channels 26, 27, 29 are arranged completely within the rotor 14 in the present case. The internal feed channels 26, 27, 29 are each fluidically connected to the corresponding spray openings 18.

In the present case, the internal feed channels 26, 27, 29 are each formed as a bore within the rotor 14. In the present case, the internal feed channels 26, 27, 29 designed as bores are oriented perpendicular to the axis of rotation 12, i.e. they run in a straight line horizontally (perpendicular to the direction of gravity 15). The direction of gravity 15 is indicated by an arrow in FIGS. 4 to 8. It is also conceivable that the internal feed channels 26, 27, 28, which are designed as bores in the present case, have a slight gradient, i.e. run inclined to the horizontal. This allows the internal feed channels 26, 27, 28 to drain automatically after the cleaning process.

Figure 6:
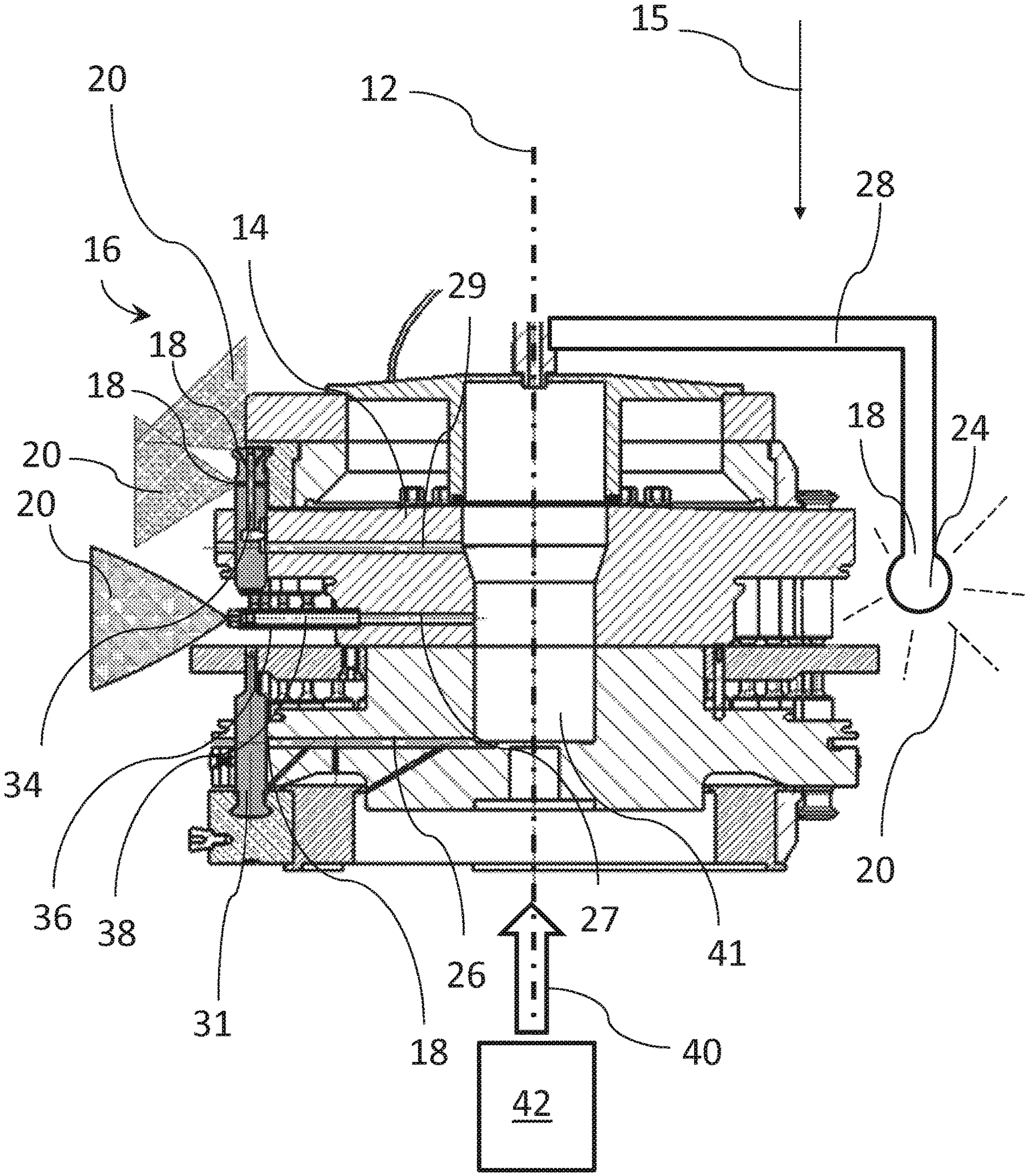
FIG. 6 is a sectional view of the rotor according to a second exemplary embodiment.

In the present case, the cleaning device 16 has an inlet 40 for guiding the cleaning agent 20 into the rotor 14. The inlet 40 is only indicated schematically by a large arrow (in FIGS. 4 and 6). The inlet 40 is arranged in the region of the axis of rotation 12 in the present case. The inlet 40 therefore opens centrally into the rotor 14. The inlet 40 can, as indicated in FIGS. 4 and 6, open into the rotor 14 from below with respect to the direction of gravity 15. It is also conceivable that the inlet 40 can open into the rotor 14 from above with respect to the direction of gravity 15.

The cleaning device 16 comprises a pump 42 for pumping the cleaning agent 20 in the present case. The pump is only indicated schematically (in FIGS. 4 and 6). The cleaning agent 20 is conveyed by the pump 42 through the inlet 40 into the rotor 14. In the rotor 14, the cleaning agent 20 pumped in through the inlet 40 is passed on to the respective spray openings 18 by means of the internal feed channels 26, 27, 29.

The internal feed channels 26, 27, 29 can each open into the inlet 40 with their right-hand end in FIG. 4. The internal feed channels 26, 27, 29 can be designed as a common channel, at least in portions. Between the internal feed channels 26, 27, 29 and the inlet 40, a chamber 41 can be arranged which fluidically connects the internal feed channels 26, 27, 29 and the inlet 40. The chamber 41 can function as a cleaning agent store or buffer.

In the present case, the lower internal feed channel 26 opens with its left-hand end in FIG. 4 into a spray opening 18, which is blocked or closed by means of a lower tableting punch 31. This allows the lower tableting punches 31 to be included in the cleaning process. The lower internal feed channel 26 and the corresponding spray opening 18 can be closed and opened again in the present case by moving the corresponding lower tableting punch 31 along the direction of gravity 15.

The cleaning device 16 comprises at least one guide element 36 in the present case. The guide element 36 is designed in the form of a straight tube in the present case. The guide element 36 can be fixed to the rotor 14 (shown in FIG. 4). A spray opening 18 is arranged at one end of the guide element 36, which end is on the left in FIG. 4. A guide channel 38 for guiding the cleaning agent 20 to the spray opening 18 is arranged within the guide element 36 in the present case. The guide channel 38 opens on the one hand (with its left-hand end in FIG. 4) into the corresponding spray opening 18 and on the other hand (with its right-hand end in FIG. 4) into the middle internal feed channel 27.

In the present case, a static spray nozzle 22 is arranged on the spray opening 18, which is arranged on the guide element 36. It is also conceivable that a rotary spray nozzle 24 (see FIGS. 7 and 8) or another spray nozzle can be arranged on the spray opening 18. The spray nozzle can be selected in order to adjust the way in which the cleaning agent 20 is sprayed (spray angle, spray direction, spray speed, spray pattern, etc.) as desired.

The cleaning device 16 comprises at least one cleaning punch 32 in the present case. The cleaning punch 32 is designed to be interchangeable with an upper tableting punch 30. The cleaning punch 32 can therefore be arranged on or fixed to the rotor 14 instead of an upper tableting punch 30. In the present case, the cleaning punch 32 is replaced by an upper tableting punch 30 and is arranged on the rotor 14.

Figure 5:
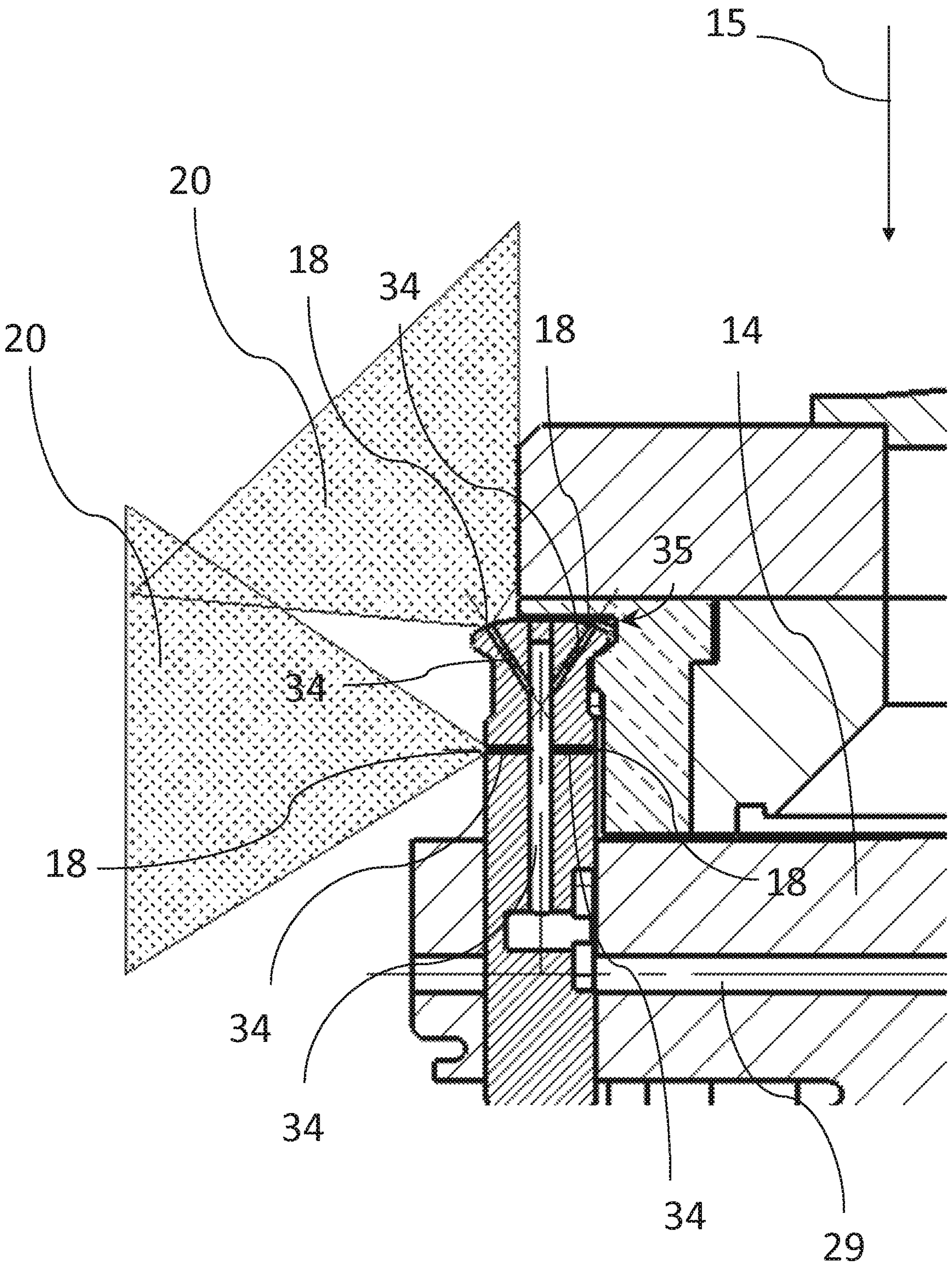
FIG. 5 shows a detail of the sectional view from FIG. 4.

FIG. 5 shows a detail of the sectional view according to FIG. 4, in which the cleaning punch 32 is shown in enlarged form.

In the present case, the cleaning punch 32 has four spray openings 18 for spraying the cleaning agent 20. The four spray openings 18 are arranged on the cleaning punch 32. Within the cleaning punch 32, four channels 34 are formed in the present case for guiding the cleaning agent 20 to the respective spray openings 18 arranged on the cleaning punch 32. On the one hand, the four channels 34 each open into the corresponding spray opening 18. On the other hand, the four channels 34 converge and open into the upper internal feed channel 29 of the rotor 14. The cleaning agent 20 can be sprayed by means of the cleaning punch 32, in particular in the region of the guide curve 35 of the upper tableting punch 30.

FIG. 6 shows a sectional view of the rotor 14 according to a second exemplary embodiment. The second exemplary embodiment differs from the first exemplary embodiment shown in FIGS. 3 to 5 by the following:

In the present case, the cleaning device 16 additionally has at least one external feed channel 28 for guiding the cleaning agent 20 to a spray opening 18. The external feed channel 28 is arranged at least in portions outside the rotor 14 in the present case.

The external feed channel 28 opens on the one hand into the chamber 41 and/or the inlet 40 and on the other hand into the corresponding spray opening 18. In the present case, a spherical, rotary spray nozzle 24 is arranged on the spray opening 18 into which the external feed channel 28 opens. By means of the rotary spray nozzle 24, the cleaning agent 20 can be sprayed in as many spatial directions as possible.

The external feed channel 28, the spray opening 18 arranged on the feed channel 28, and the rotary spray nozzle 24 arranged on this spray opening 18 are shown only schematically (in FIG. 6).

Figure 7:
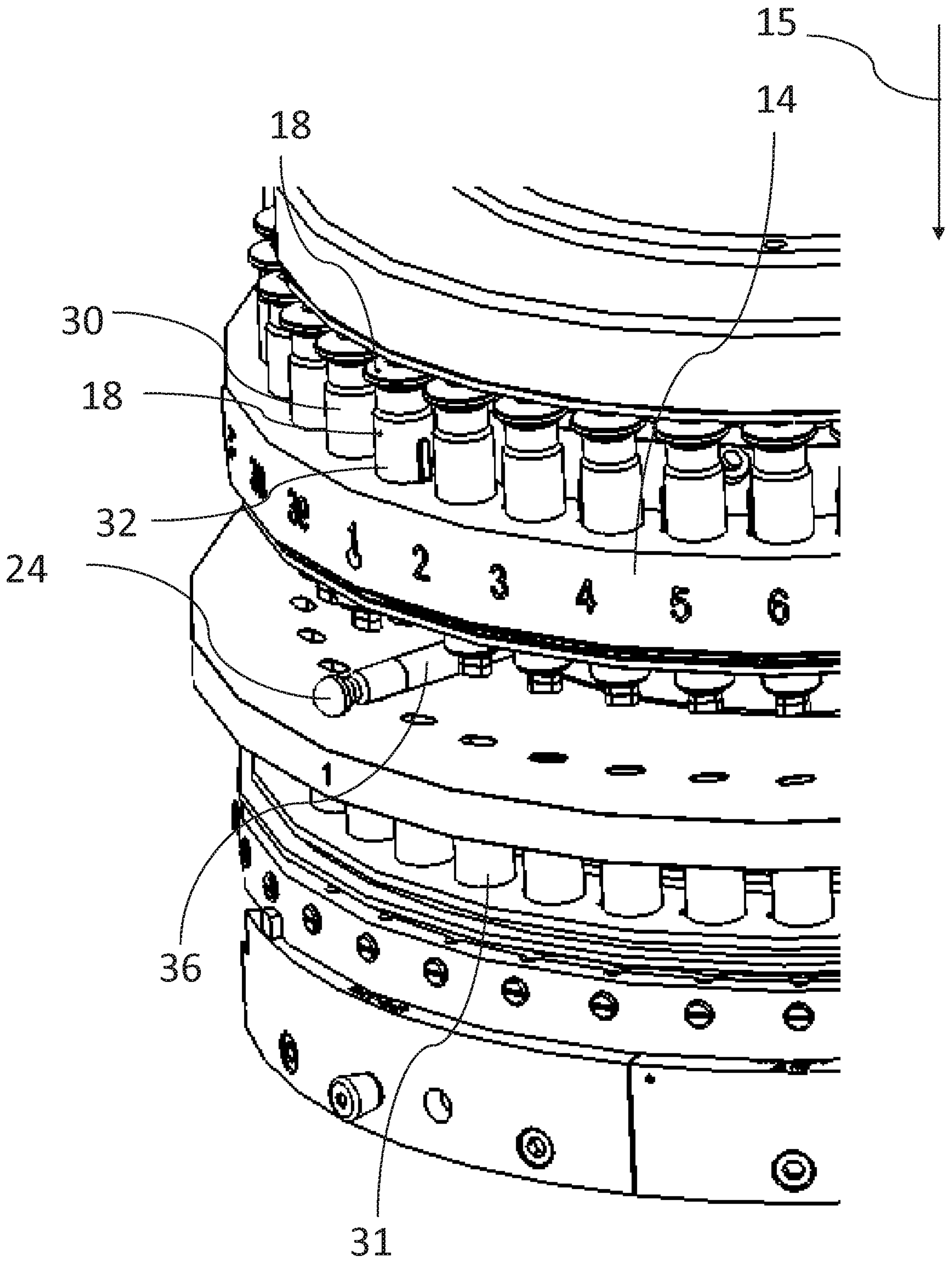
FIG. 7 shows a detail of a perspective view of the rotor according to a third exemplary embodiment and FIG. 8 shows a detail of a sectional view of the rotor according to FIG. 7.
Figure 8:
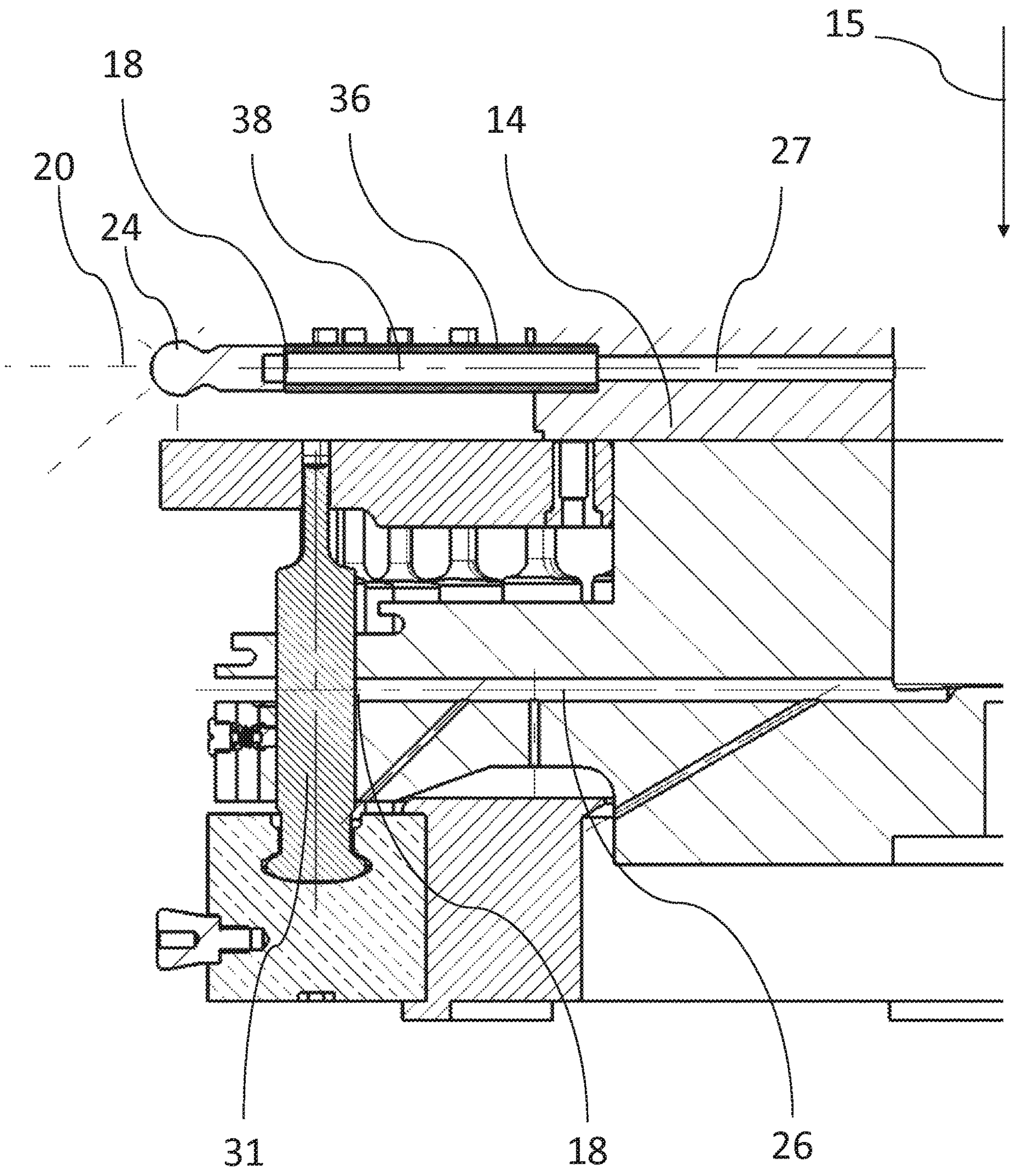

FIG. 7 shows a detail of a perspective view and FIG. 8 shows a detail of a sectional view of the rotor 14 according to a third exemplary embodiment. The third exemplary embodiment differs from the first and/or second exemplary embodiment by the following:

On the spray opening 18, which is arranged on the guide element 36, a spherical, rotary spray nozzle 24 is arranged instead of the static spray nozzle 22. By means of the spherical, rotary spray nozzle 24, the cleaning agent 20 can be sprayed in as many spatial directions as possible.

The method for cleaning the rotary press 10 according to the above statements is explained below with reference to FIGS. 1 to 8:

The method comprises the steps of:

rotating the spray openings 18 about the axis of rotation 12 by rotating the rotor 14. Since the spray openings 18 are integrated into the rotor 14 and/or coupled to the rotor 14, they rotate with the rotor 14.

spraying the cleaning agent 20 through the spray openings 18 and/or through the static spray nozzle 22 and/or the rotary spray nozzle(s) 24.

In the present case, the method comprises the step of:

pumping the cleaning agent 20 in a circuit. For this purpose, the cleaning agent 20 can be pumped by means of the pump 42 in a circle, through the rotor 14 and/or the cleaning device 16. The cleaning agent 20 can thus be reused several times.

Alternatively, the method can comprise the step of:

collecting and disposing of the sprayed cleaning agent 20 after spraying the cleaning agent 20 once through the spray openings 18 and/or through the static spray nozzle 22 and/or through the rotary spray nozzle(s) 24. The cleaning agent 20 can be collected in a collecting container (not shown) after being sprayed once.

The method comprises the following step in the present case:

guiding the cleaning agent 20 through the internal feed channels 26, 27, 29, the external feed channel 28, the channels 34 of the cleaning punch 32 and/or the guide channel 38 of the guide element 36. In this way, all channels and/or spray openings 18, in particular those that are fluidically connected to one another, are acted upon or supplied with the cleaning agent 20.

The method comprises the following step in the present case:

closing a spray opening 18 and/or the lower internal feed channel 26. This can be implemented, for example, by means of a lower tableting punch 31. By moving the lower tableting punch 31 along the direction of gravity 15, the lower internal feed channel 26 or the spray opening 18 arranged on the lower internal feed channel 26 can be closed or opened again. This allows the spray pattern of the cleaning agent 20 to be influenced and adjusted as desired.

The invention claimed is:

1. A rotary press (10) comprising: a rotor (14) rotatable about an axis of rotation (12), wherein the rotor comprises an upper tableting punch (30) and/or a lower tableting punch (31) and a cleaning device (16) for cleaning the rotary press (10), wherein the cleaning device (16) comprises a spray opening (18) for spraying a cleaning agent (20), wherein the cleaning device (16) is coupled to the rotor (14) and configured such that the spray opening (18) can be rotated about the axis of rotation (12) by rotating the rotor (14).

2. The rotary press (10) according to claim 1, wherein a static spray nozzle (22) is arranged on the spray opening (18).

3. The rotary press (10) according to claim 1, wherein a rotary spray nozzle (24) is arranged on the spray opening (18).

4. The rotary press (10) according to claim 1, wherein the cleaning device (16) comprises an internal feed channel (26, 27, 29) for guiding the cleaning agent (20) to the spray opening (18), wherein the internal feed channel (26, 27, 29) is arranged at least in portions within the rotor (14).

5. The rotary press (10) according to claim 4, wherein the internal feed channel (26, 27, 29) is formed at least in the portions as a bore within the rotor (14).

6. The rotary press (10) according to claim 1, wherein the cleaning device (16) comprises an external feed channel (28) for guiding the cleaning agent (20) to the spray opening (18), wherein the external feed channel (28) is arranged at least in portions outside the rotor (14).

7. The rotary press (10) according to claim 1, wherein the cleaning device (16) comprises a cleaning punch (32), wherein the cleaning punch (32) is configured to be interchangeable with the lower tableting punch (31) and/or the upper tableting punch (30), wherein the spray opening (18) is arranged in or on the cleaning punch (32), wherein at least one channel (34) for guiding the cleaning agent (20) to the spray opening (18) is arranged within the cleaning punch (32).

8. The rotary press (10) according to claim 1, wherein the cleaning device (16) comprises a guide element (36), wherein the guide element (36) is configured to be fixable to the rotor (14), wherein the spray opening (18) is arranged in or on the guide element (36), wherein a guide channel (38) for guiding the cleaning agent (20) to the spray opening (18) is arranged within the guide element (36).

9. The rotary press (10) according to claim 1, wherein the cleaning device (16) comprises an inlet (40) for guiding the cleaning agent (20) into the rotor (14).

10. The rotary press (10) according to claim 1, wherein the cleaning device (16) comprises a pump (42) for pumping the cleaning agent (20).

11. The rotary press (10) according to claim 1, wherein the rotary press is a rotary tablet press.

12. The rotary press (10) according to claim 1, wherein the cleaning device (16) comprises a plurality of spray openings (18) as the spray opening (18).

13. A method for cleaning a rotary press (10) according to claim 1, comprising the steps of:

rotating the spray opening (18) about the axis of rotation (12) by rotating the rotor (14);

spraying the cleaning agent (20) through the spray opening (18).

14. The method according to claim 13, further comprising the step of:

pumping the cleaning agent (20) in a circuit.

15. The method according to claim 13, further comprising the step of:

collecting and disposing of the sprayed cleaning agent (20) after spraying the cleaning agent (20) once through the spray opening (18).

16. The method according to claim 13, further comprising the step of:

guiding the cleaning agent (20) through an internal feed channel (26, 27, 29), an external feed channel (28), a channel (34) of a cleaning punch (32), and/or a guide channel (38) of a guide element.

17. The method according to claim 13, further comprising the step of:

closing the spray opening (18) and/or an internal feed channel (26, 27, 29).

* * * * *